United States Patent
Zhong et al.

(10) Patent No.: US 12,098,072 B2
(45) Date of Patent: Sep. 24, 2024

(54) LITHIUM IRON PHOSPHATE MATERIAL AND PREPARATION METHOD THEREFOR

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); YICHANG BRUNP CONTEMPORARY AMPEREX CO., LTD., Hubei (CN)

(72) Inventors: Yingsheng Zhong, Guangdong (CN); Haijun Yu, Guangdong (CN); Yinghao Xie, Guangdong (CN); Aixia Li, Guangdong (CN); Cunpeng Qin, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); YICHANG BRUNP CONTEMPORARY AMPEREX CO., LTD., Hubei (CN)

( * ) Notice: Subject to any disclaimer, the term of this patent is extended or adjusted under 35 U.S.C. 154(b) by 0 days.

(21) Appl. No.: 18/288,687

(22) PCT Filed: Aug. 26, 2022

(86) PCT No.: PCT/CN2022/115295
§ 371 (c)(1),
(2) Date: Oct. 27, 2023

(87) PCT Pub. No.: WO2023/116019
PCT Pub. Date: Jun. 29, 2023

(65) Prior Publication Data
US 2024/0140799 A1 May 2, 2024

(30) Foreign Application Priority Data

Dec. 22, 2021 (CN) .......................... 202111578337.7

(51) Int. Cl.
*C01B 25/45* (2006.01)
*H01M 4/58* (2010.01)

(52) U.S. Cl.
CPC .......... *C01B 25/45* (2013.01); *C01P 2004/03* (2013.01); *C01P 2006/12* (2013.01); *C01P 2006/40* (2013.01); *H01M 4/5825* (2013.01)

(58) Field of Classification Search
None
See application file for complete search history.

(56) References Cited

U.S. PATENT DOCUMENTS

2010/0102270 A1  4/2010  Jia et al.
2014/0239235 A1  8/2014  Kong et al.

FOREIGN PATENT DOCUMENTS

| CN | 1792780 A | 6/2006 |
|---|---|---|
| CN | 101332985 A | 12/2008 |

(Continued)

OTHER PUBLICATIONS

Zhao et al., Research progress on liquid synthesis of lithium ferrous phosphate, Energy Storage Science and Technology, 2014 (Year: 2014).*

(Continued)

*Primary Examiner* — Coris Fung
*Assistant Examiner* — Keling Zhang
(74) *Attorney, Agent, or Firm* — MYERS WOLIN, LLC

(57) ABSTRACT

A preparation method of a ferrous lithium phosphate material includes the following steps: (1) mixing zinc source, copper source and complexing agent solution, then mixing with iron source and phosphoric acid source, evaporating and dehydrating to obtain a jelly, and then primary sintering (Continued)

the jelly under a protective atmosphere to obtain a solid-phase material; and (2) mixing the solid-phase material prepared in step (1) with a lithium source, grinding and secondary sintering under a protective atmosphere to obtain the ferrous lithium phosphate material.

8 Claims, 2 Drawing Sheets

(56) References Cited

FOREIGN PATENT DOCUMENTS

| | | |
|---|---|---|
| CN | 101428781 A | 5/2009 |
| CN | 101508431 A | 8/2009 |
| CN | 101593831 A | 12/2009 |
| CN | 102020260 A | 4/2011 |
| CN | 102751548 A | 10/2012 |
| CN | 103066258 A | 4/2013 |
| CN | 104733728 A | 6/2015 |
| CN | 106328939 A | 1/2017 |
| CN | 108448070 A | 8/2018 |
| CN | 109148837 A | 1/2019 |
| CN | 111217346 A | 6/2020 |
| CN | 114380281 A | 4/2022 |
| CN | 114380281 B | 7/2023 |
| WO | 2008/145034 A1 | 12/2008 |
| WO | 2009/015565 A1 | 2/2009 |

OTHER PUBLICATIONS

Machine translation of Zhang, et al., CN 108448070A (Zhang) (Year: 2020).*

International Search Report with Written Opinion of the International Search Authority issued by the China National Intellectual Property Administration for International Patent Application No. PCT/CN2022/115295, mailed on Nov. 15, 2022, with an English translation.

Notice of First Office Action and Search Report issued by the China National Intellectual Property Administration for Chinese Patent Application No. CN202111578337.7, dated Dec. 12, 2022, with an English translation.

First Office action issued on Dec. 12, 2022 by the State Intellectual Property Office of People's Republic of China for Chinese application No. 202111578337.7, with English translation.

Notification to Grant patent right for invention issued on May 2, 2024 by the State Intellectual Property Office of People's Republic of China for Chinese application No. 202111578337.7, with English translation.

* cited by examiner

LITHIUM IRON PHOSPHATE MATERIAL AND PREPARATION METHOD THEREFOR

CROSS-REFERENCE TO RELATED APPLICATION

This application is a national stage filing under 35 U.S.C. § 371 of international application number PCT/CN2022/115295, filed Aug. 26, 2022, which claims priority to Chinese patent application No. 202111578337.7 filed Dec. 22, 2021. The contents of these applications are incorporated herein by reference in their entirety.

TECHNICAL FIELD

The present disclosure belongs to the technical field of lithium-ion battery materials, in particular to a ferrous lithium phosphate material and a preparation method thereof.

BACKGROUND

In the latest ten years, the technology of new energy industry supported by lithium-ion batteries has developed rapidly and achieved great commercial success. Among various lithium-ion battery technologies, ferrous lithium phosphate (LiFePO4, LFP) battery plays a key role in electric energy storage and electric transportation because of its excellent safety performance, long cycle stability and economy. The ferrous lithium phosphate material accounts for more than 40% of the cost of the ferrous lithium phosphate battery, which plays an important role.

It is undeniable that the ferrous lithium phosphate material is one of the core materials of lithium-ion batteries at present. In 2021, the output and installed capacity of the ferrous lithium phosphate batteries in China reached more than 50% in the middle of the year. It is expected that from 2022 to 2023, the ferrous lithium phosphate batteries for passenger cars are expected to account for more than half of the battery types for passenger cars. In 2024, the global shipment of the ferrous lithium phosphate batteries will exceed 550 GWh, and the demand for ferrous lithium phosphate materials can break through 120 wt, reaching an average annual growth rate of more than 60%. In order to meet the current and future consumption demand of the ferrous lithium phosphate materials and solve the contradiction between upstream and downstream supply and demand of the ferrous lithium phosphate batteries, the current main methods are as follows: on the one hand, through the new strategy of efficient recycling of waste ferrous lithium phosphate batteries and obtaining excellent phosphoric acid and lithium resources, the purposes of low pollution to the environment and high returns on resources are achieved; on the other hand, we should give full play to the abundant phosphorus and lithium resources in China and other parts of the world, expand from the source of the required material resources and improve production. Therefore, it is particularly important to research and develop phosphorus and lithium resources, especially to study and synthesize ferrous lithium phosphate precursors and ferrous lithium phosphate materials based on China's rich phosphorus resources.

The existing preparation methods of the ferrous lithium phosphate materials are mostly dry mixing process. Although this process is simple, the prepared ferrous lithium phosphate materials have poor electrochemical performance and cannot meet the increasingly high quality requirements for electrode materials in the market.

SUMMARY

The present disclosure aims to solve at least one of the technical problems existing in the existing technology. To this end, the present disclosure provides a ferrous lithium phosphate material and a preparation method thereof. The ferrous lithium phosphate material prepared by this method has good electrochemical performance and can meet the increasingly high quality requirements for electrode materials in the market.

The above technical object of the present disclosure is realized through the following technical solution:

a preparation method of a ferrous lithium phosphate material, including the following steps: (1) mixing the zinc source, copper source and complexing agent solution, then mixing with iron source and phosphoric acid source, evaporating and dehydrating to obtain a jelly, and then primary sintering the jelly under a protective atmosphere to obtain a solid-phase material; and (2) mixing the solid-phase material prepared in step (1) with a lithium source, grinding and secondary sintering under a protective atmosphere to obtain the ferrous lithium phosphate material.

Preferably, the complexing agent solution is obtained by mixing a citric acid solution and acetylacetone, the concentration of the citric acid in the citric acid solution is 1 to 20 w/w %, and the acetylacetone accounts for 1 to 12 v/v % of the citric acid solution.

Preferably, the mass of the zinc source accounts for 0.1 to 5 w/w % of the citric acid solution, and the mass of the copper source accounts for 0.1 to 5 w/w % of the citric acid solution.

Preferably, the molar ratio of the phosphoric acid, the iron and the lithium in the phosphoric acid, iron source and lithium source is (1.0-1.2):(1.0-1.05):(1.0-1.01).

Preferably, the sintering temperature of the primary sintering and the secondary sintering is 600 to 950° C., and the sintering time is 6 to 15 hours.

Preferably, the particle size of the material after grinding in step (2) is less than 80 μm.

Preferably, the lithium source is at least one of lithium hydroxide, lithium carbonate, lithium nitrate or lithium chloride.

Preferably, the phosphoric acid source is at least one of phosphoric acid, ammonium phosphate, potassium phosphate, lithium phosphate, ammonium dihydrogen phosphate, sodium dihydrogen phosphate or potassium dihydrogen phosphate.

Preferably, the protective atmosphere described in step 1 is at least one of Ne, Ar, Kr or He.

Preferably, the iron source is at least one of ferrous chloride, ferrous sulfate or ferrous hydroxide.

Preferably, the phosphoric acid source is phosphoric acid, which is prepared from phosphorus concentrate.

Further preferably, the preparation method of the phosphoric acid includes the following steps:

A1: preparation of crude phosphoric acid: adding a first acid to the phosphorus concentrate for activation reaction, then adding a second acid, leaching and press filtering to obtain the filtrate, and then adding water to adjust the concentration to obtain the crude phosphoric acid.

A2: preparation of phosphoric acid: adding an extractant into the crude phosphoric acid, mixing and extracting, oscillation separating to obtain a primary extraction solution and an impurity solution, acid washing the primary extraction solution to obtain a primary phosphoric acid, secondary extracting and oscillation separating the primary phosphoric acid to obtain a secondary extraction solution, acid washing the secondary extraction solution to obtain a secondary phosphoric acid, and then repeatedly extracting and acid leaching the secondary phosphoric acid (3 to 8 times) to obtain the required phosphoric acid.

Preferably, the mass proportion of $P_2O_5$ in the phosphorus concentrate in step A1 is great than or equal to 24%.

Preferably, the first acid in step A1 is at least one of formic acid, acetic acid or phosphoric acid.

Preferably, the stoichiometric ratio (kg/L) of phosphorus concentrate to the first acid used in the activation reaction in step A1 is (0.1-15):(0.2-30).

Preferably, the second acid in step A1 is hydrochloric acid with a concentration of 5.0 to 37.5 w/w %.

Preferably, the stoichiometric ratio (kg/L) of phosphorus concentrate to the second acid in step A1 is (0.1-15):(0.2-100).

Preferably, the leaching temperature in step A1 is 35 to 70° C.

Preferably, after adjusting the concentration with water in step A1, the concentration of the phosphoric acid in the obtained crude phosphoric acid is 1 to 30%.

Preferably, the extractant in step A2 is obtained by mixing propyl acetate/propyl formate and diisopropyl ether according to a volume ratio of (0.5-5):(0.5-3).

Preferably, the extraction in step A2 is to extract by mixing the crude phosphoric acid with the extractant according to a volume ratio of (1-2):(3-20).

Preferably, the acid washing in step A2 is to mix the deionized water with the extraction solution according to a volume ratio of 1:(1-5), then oscillating for 1 to 10 minutes and standing still for 5 to 30 minutes, and the lower liquid being the phosphoric acid solution.

Preferably, the impurity content in the phosphoric acid prepared in step A2: Ca<0.01%, Mg<0.02%, Al<0.02%.

Preferably, the zinc source is at least one of zinc oxide, zinc hydroxide, zinc chloride or zinc sulfate.

Preferably, the copper source is at least one of copper oxide, copper hydroxide, copper chloride or copper sulfate.

A ferrous lithium phosphate material prepared by the preparation method as described above.

The beneficial effects of the present disclosure are as follows:

(1) According to the preparation method of the ferrous lithium phosphate material of the present disclosure, a specific complexing agent is used to mix the zinc source, copper source, phosphoric acid and iron source, which is then sintered into a solid-phase material, and then it is mixed with a lithium source and sintered to prepare a zinc/copper doped bark porous ferrous lithium phosphate material, so that it has a larger surface area and richer lithium-ion binding sites, so that the chemical reaction sites of the electrochemical reaction are increased, the structure is stable, the contact range between ferrous lithium phosphate and electrolyte can be enlarged, and the lithium storage sites of the synthesized ferrous lithium phosphate are correspondingly increased. At the same time, the diffusion path of the lithium-ions is shortened, and the de-intercalation rate of the lithium-ions during charge and discharge is improved, so that it has better electrochemical performance, and can meet the increasingly high quality requirements for electrode materials in the market;

(2) The phosphorus source used in the preparation method of the ferrous lithium phosphate material of the present disclosure is prepared from phosphorus concentrate. By using a specific extractant to extract the phosphoric acid in the crude phosphoric acid, the prepared phosphoric acid has less impurities, high purity and good separation effect. At the same time, the extraction of phosphoric acid only needs extractant and deionized water, the production process and equipment are relatively simple and can be operated continuously with large production capacity, and is suitable for industrial production.

DETAILED DESCRIPTION

Figure 1:
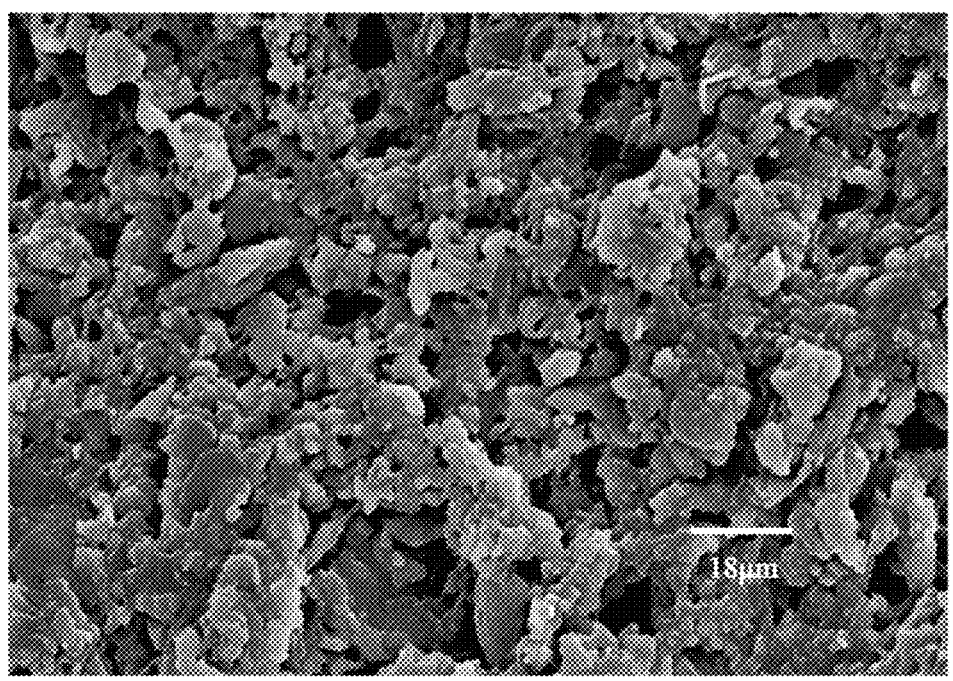
FIG. 1 is a SEM diagram of the ferrous lithium phosphate material of Embodiment 2.

The present disclosure will be further described below in combination with specific Embodiments.

Embodiment 1

A preparation method of a ferrous lithium phosphate material including the following steps:

(1) Preparation of crude phosphoric acid: weighing 0.5 kg of phosphorus concentrate (the mass proportion of $P_2O_5$ in the phosphorus concentrate being 27.3%), and mixing the same with 1.2 L of acetic acid (14.7 w/w %) for activation reaction, adding 6.2 L of hydrochloric acid (26.5 w/w %) for leaching at a leaching temperature of 39° C. and filter-pressing to obtain a filtrate, adding 2.1 L of water to adjust the concentration to obtain 8.3 L of crude phosphoric acid solution.

(2) Preparation of phosphoric acid: taking 8.3 L of crude phosphoric acid solution prepared in step (1) and mixing with 12 L of extractant (in a volume ratio of propyl acetate to diisopropyl ether of 2:0.5), extracting and sending to the oscillator, oscillating for 15 minutes, standing still and separating to obtain about 12.4 L of upper primary extraction solution and 7.9 L of lower impurity solution, mixing the primary extraction solution with 3 L of deionized water, sending the same to the oscillator, acid washing to obtain the lower primary phosphoric acid, repeating the above extractant extraction, acid washing with deionized water for 6 times for the primary phosphoric acid to obtain 7-time phosphoric acid, and then evaporating and dehydrating at 107° C. to obtain about 91 mL of phosphoric acid.

(3) Adding 1 mL of acetylacetone, 0.05 g of copper chloride and 0.35 g of zinc chloride to 20 mL of citric acid (17.3 w/w %), mixing the same to obtain a citric acid solution, and then adding 5.5 mL of phosphoric acid prepared in step (2) and 50 mL of ferrous sulfate solution (1.45 mol/L), mixing evenly, then evaporating and dehydrating to obtain a jelly, sintering the jelly under Ar in a tubular furnace at 640° C. for 12 hours, and then cooling to obtain the solid-phase material.

(4) Mixing the solid-phase material prepared in step (3) with 110 mL of lithium hydroxide solution (0.708 mol/L) evenly and sending the same to a drying oven for dehydration to obtain the solid-phase material, then grinding, sintering under Ar in a tubular furnace at 710° C. for 7 hours, and annealing to obtain the ferrous lithium phosphate material.

A ferrous lithium phosphate material was prepared by the preparation method as described above.

Embodiment 2

A preparation method of a ferrous lithium phosphate material including the following steps:

(1) Preparation of crude phosphoric acid: weighing 0.5 kg of phosphorus concentrate (the mass proportion of $P_2O_5$ in the phosphorus concentrate being 27.2%), and mixing the same with 1.3 L of acetic acid (14.7 w/w %) for activation reaction, adding 6.3 L of hydrochloric acid (26.5 w/w %) for leaching at a leaching temperature of 52° C. and filter-pressing to obtain a filtrate, adding 2.5 L of water to adjust the concentration to obtain 8.4 L of crude phosphoric acid solution.

(2) Preparation of phosphoric acid: taking 8.4 L of crude phosphoric acid solution prepared in step (1) and mixing with 12.5 L of extractant (in a volume ratio of propyl acetate to diisopropyl ether of 2:0.8), extracting and sending to the oscillator, oscillating for 15 minutes, standing still and separating to obtain about 12.8 L of upper primary extraction solution and 8.1 L of lower impurity solution, mixing the primary extraction solution with 3.5 L of deionized water, sending the same to the oscillator, acid washing to obtain the lower primary phosphoric acid, repeating the above extractant extraction, acid washing with deionized water for 5 times for the primary phosphoric acid to obtain 7-time phosphoric acid, and then evaporating and dehydrating at 107° C. to obtain about 91 mL of phosphoric acid.

(3) Adding 2 mL of acetylacetone, 0.15 g of copper chloride and 0.1 g of zinc chloride to 20 mL of citric acid (17.3 w/w %), mixing the same to obtain a citric acid solution, and then adding 5.5 mL of phosphoric acid prepared in step (2) and 50 mL of ferrous sulfate solution (1.45 mol/L), mixing evenly, then evaporating and dehydrating to obtain a jelly, sintering the jelly under Ar in a tubular furnace at 640° C. for 8 hours, and then cooling to obtain the solid-phase material.

(4) Mixing the solid-phase material prepared in step (3) with 1 L of lithium hydroxide solution (0.708 mol/L) evenly and sending the same to a drying oven for dehydration to obtain the solid-phase material, then grinding, sintering under Ar in a tubular furnace at 710° C. for 7 hours, and annealing to obtain the ferrous lithium phosphate material.

A ferrous lithium phosphate material was prepared by the preparation method as described above.

Embodiment 3

A preparation method of a ferrous lithium phosphate material including the following steps:

(1) Preparation of crude phosphoric acid: weighing 0.5 kg of phosphorus concentrate (the mass proportion of $P_2O_5$ in the phosphorus concentrate being 27.4%), and mixing the same with 1.4 L of acetic acid (14.7 w/w %) for activation reaction, adding 6.8 L of hydrochloric acid (26.5 w/w %) for leaching at a leaching temperature of 54° C. and filter-pressing to obtain a filtrate, adding 2.8 L of water to adjust the concentration to obtain 9.4 L of crude phosphoric acid solution.

(2) Preparation of phosphoric acid: taking 9.4 L of crude phosphoric acid solution prepared in step (1) and mixing with 15 L of extractant (in a volume ratio of propyl acetate to diisopropyl ether of 2.2:1.0), extracting and sending to the oscillator, oscillating for 15 minutes, standing still and separating to obtain about 15.3 L of upper primary extraction solution and 9 L of lower impurity solution, mixing the primary extraction solution with 3.6 L of deionized water, sending the same to the oscillator, acid washing to obtain the lower primary phosphoric acid, repeating the above extractant extraction, acid washing with deionized water for 4 times for the primary phosphoric acid to obtain 5-time phosphoric acid, and then evaporating and dehydrating at 107° C. to obtain about 90 mL of phosphoric acid.

(3) Adding 2 mL of acetylacetone, 0.1 g of copper chloride and 0.25 g of zinc chloride to 25 mL of citric acid (17.3 w/w %), mixing the same to obtain a citric acid solution, and then adding 5 mL of phosphoric acid prepared in step (2) and 50 mL of ferrous sulfate solution (1.45 mol/L), mixing evenly, then evaporating and dehydrating to obtain a jelly, sintering the jelly under Ar in a tubular furnace at 670° C. for 6 hours, and then cooling to obtain the solid-phase material.

(4) Mixing the solid-phase material prepared in step (3) with 105 mL of lithium hydroxide solution (0.708 mol/L) evenly and sending the same to a drying oven for dehydration to obtain the solid-phase material, then grinding, sintering under Ar in a tubular furnace at 710° C. for 7 hours, and annealing to obtain the ferrous lithium phosphate material.

A ferrous lithium phosphate material was prepared by the preparation method as described above.

Embodiment 4

A preparation method of a ferrous lithium phosphate material including the following steps:

(1) Preparation of crude phosphoric acid: weighing 0.5 kg of phosphorus concentrate (the mass proportion of $P_2O_5$ in the phosphorus concentrate being 27.3%), and mixing the same with 1.5 L of acetic acid (14.7 w/w %) for activation reaction, adding 7.3 L of hydrochloric acid (26.5 w/w %) for leaching at a leaching temperature of 65° C. and filter-pressing to obtain a filtrate, adding 2.4 L of water to adjust the concentration to obtain 9.6 L of crude phosphoric acid solution.

(2) Preparation of phosphoric acid: taking 9.6 L of crude phosphoric acid solution prepared in step (1) and mixing with 16 L of extractant (in a volume ratio of propyl acetate to diisopropyl ether of 2.4:1.0), extracting and sending to the oscillator, oscillating for 15 minutes, standing still and separating to obtain about 16.2 L of upper primary extraction solution and 9.4 L of lower impurity solution, mixing the primary extraction solution with 3.8 L of deionized water, sending the same to the oscillator, acid washing to obtain the lower primary phosphoric acid, repeating the above extractant extraction, acid washing with deionized water for 7 times for the primary phosphoric acid to obtain 8-time phosphoric acid, and then evaporating and dehydrating at 107° C. to obtain about 89 mL of phosphoric acid.

(3) Adding 3 mL of acetylacetone, 0.1 g of copper sulfate and 0.2 g of zinc sulfate to 25 mL of citric acid (17.3 w/w %), mixing the same to obtain a citric acid solution, and then adding 5 mL of phosphoric acid prepared in step (2) and 50 mL of ferrous sulfate solution (1.45 mol/L), mixing evenly, then evaporating and dehydrating to obtain a jelly, sintering the jelly under Ar in a tubular furnace at 650° C. for 7.5 hours, and then cooling to obtain the solid-phase material.

(4) Mixing the solid-phase material prepared in step (3) with 110 mL of lithium hydroxide solution (0.708 mol/L) evenly and sending the same to a drying oven for dehydration to obtain the solid-phase material, then grinding, sintering under Ar in a tubular furnace at 630° C. for 8 hours, and annealing to obtain the ferrous lithium phosphate material.

A ferrous lithium phosphate material was prepared by the preparation method as described above.

Embodiment 5

A preparation method of a ferrous lithium phosphate material including the following steps:

(1) Preparation of crude phosphoric acid: weighing 0.5 kg of phosphorus concentrate (the mass proportion of $P_2O_5$ in the phosphorus concentrate being 27.3%), and mixing the same with 1.0 L of acetic acid (14.7 w/w %) for activation reaction, adding 7.6 L of hydrochloric acid (26.5 w/w %) for leaching at a leaching temperature of 68° C. and filter-pressing to obtain a filtrate, adding 2.5 L of water to adjust the concentration to obtain 9.9 L of crude phosphoric acid solution.

(2) Preparation of phosphoric acid: taking 9.9 L of crude phosphoric acid solution prepared in step (1) and mixing with 18 L of extractant (in a volume ratio of propyl acetate to diisopropyl ether of 2.5:1.3), extracting and sending to the oscillator, oscillating for 15 minutes, standing still and separating to obtain about 18.2 L of upper primary extraction solution and 9.7 L of lower impurity solution, mixing the primary extraction solution with 3.5 L of deionized water, sending the same to the oscillator, acid washing to obtain the lower primary phosphoric acid, repeating the above extractant extraction, acid washing with deionized water for 5 times for the primary phosphoric acid to obtain 6-time phosphoric acid, and then evaporating and dehydrating at 107° C. to obtain about 86 mL of phosphoric acid.

(3) Adding 3 mL of acetylacetone, 0.1 g of copper sulfate and 0.3 g of zinc sulfate to 30 mL of citric acid (17.3 w/w %), mixing the same to obtain a citric acid solution, and then adding 5.5 mL of phosphoric acid prepared in step (2) and 52 mL of ferrous sulfate solution (1.45 mol/L), mixing evenly, then evaporating and dehydrating to obtain a jelly, sintering the jelly under Ar in a tubular furnace at 650° C. for 7.5 hours, and then cooling to obtain the solid-phase material.

(4) Mixing the solid-phase material prepared in step (3) with 115 mL of lithium hydroxide solution (0.708 mol/L) evenly and sending the same to a drying oven for dehydration to obtain the solid-phase material, then grinding, sintering under Ar in a tubular furnace at 630° C. for 8 hours, and annealing to obtain the ferrous lithium phosphate material.

A ferrous lithium phosphate material was prepared by the preparation method as described above.

Comparative Example 1

A preparation method of a ferrous lithium phosphate material including the following steps:

(1) Preparation of crude phosphoric acid: weighing 0.5 kg of phosphorus concentrate (the mass proportion of $P_2O_5$ in the phosphorus concentrate being 27.3%), and mixing the same with 1.2 L of acetic acid (14.7 w/w %) for activation reaction, adding 7.3 L of hydrochloric acid (26.5 w/w %) for leaching at a leaching temperature of 45° C. and filter-pressing to obtain a filtrate, adding 2.5 L of water to adjust the concentration to obtain 9.2 L of crude phosphoric acid solution.

(2) Preparation of phosphoric acid: taking 9.2 L of crude phosphoric acid solution prepared in step (1) and mixing with 14 L of extractant (in a volume ratio of propyl acetate to diisopropyl ether of 2:0.6), extracting and sending to the oscillator, oscillating for 15 minutes, standing still and separating to obtain about 14.2 L of upper primary extraction solution and 9.1 L of lower impurity solution, mixing the primary extraction solution with 3.5 L of deionized water, sending the same to the oscillator, acid washing to obtain the lower primary phosphoric acid, repeating the above extractant extraction, acid washing with deionized water for 5 times for the primary phosphoric acid to obtain 6-time phosphoric acid, and then evaporating and dehydrating at 107° C. to obtain about 91 mL of phosphoric acid.

(3) Mixing 5 mL of the phosphoric acid solution prepared in step (2) with 50 mL of ferrous sulfate solution (1.45 mol/L) evenly, evaporating and dehydrating to obtain a solid substance, sintering the solid substance under Ar in a tubular furnace at 740° C. for 7.5 hours, and then cooling to obtain the solid-phase material.

(4) Mixing the solid-phase material prepared in step (3) with 110 mL of lithium hydroxide (0.708 mol/L) evenly and sending the same to a drying oven for dehydration to obtain the solid-phase material, then grinding, sintering under Ar in a tubular furnace at 680° C. for 10 hours, and annealing to obtain the ferrous lithium phosphate material.

A ferrous lithium phosphate material was prepared by the preparation method as described above.

Comparative Example 2

A preparation method of a ferrous lithium phosphate material including the following steps:

(1) Preparation of crude phosphoric acid: weighing 0.5 kg of phosphorus concentrate (the mass proportion of $P_2O_5$ in the phosphorus concentrate being 27.3%), and mixing the same with 1.2 L of acetic acid (14.7 w/w %) for activation reaction, adding 7.3 L of hydrochloric acid (26.5 w/w %) for leaching at a leaching temperature of 45° C. and filter-pressing to obtain a filtrate, adding 2.5 L of water to adjust the concentration to obtain 9.2 L of crude phosphoric acid solution.

(2) Preparation of phosphoric acid: taking 9.2 L of crude phosphoric acid solution prepared in step (1) and mixing with 14 L of propyl acetate, extracting and sending to the oscillator, oscillating for 15 minutes, standing still and separating to obtain about 14.3 L of upper primary extraction solution and 8.9 L of lower impurity solution, mixing the primary extraction solution with 3.2 L of deionized water, sending the same to the oscillator, acid washing to obtain the lower primary phosphoric acid, repeating the above extractant extraction, acid washing with deionized water for 5 times for the primary phosphoric acid to obtain 6-time phosphoric acid, and then evaporating and dehydrating at 107° C. to obtain about 88 mL of phosphoric acid.

(3) Adding 5 mL of phosphoric acid prepared in step (2) and 50 mL of ferrous sulfate solution (1.45 mol/L) to 30 mL of citric acid (17.3 w/w %), and mixing evenly, then evaporating and dehydrating to obtain a jelly, sintering the jelly under Ar in a tubular furnace at 650° C. for 7.5 hours, and then cooling to obtain the solid-phase material.

(4) Mixing the solid-phase material prepared in step (3) with 110 mL of lithium hydroxide solution (0.708 mol/L) evenly and sending the same to a drying oven to obtain the solid-phase material, then grinding, sintering under Ar in a tubular furnace at 680° C. for 10 hours, and annealing to obtain the ferrous lithium phosphate material.

A ferrous lithium phosphate material was prepared by the preparation method as described above.

Experiment

The contents of impurities in the crude phosphoric acid and the phosphoric acid prepared in Embodiments 1-5 and Comparative Examples 1-2 were tested. The test results are shown in Table 1. At the same time, the ferrous lithium phosphate materials prepared in Embodiments 1-5 and Comparative Examples 1-2 were used as the anode material of the battery to make a button battery, and then the chemical performances of the button battery were tested, and the test results are shown in Table 2.

TABLE 1

Contents of impurities in the crude phosphoric acid and the phosphoric acid prepared in Embodiments 1-5 and Comparative Examples 1-2

| Group | Crude phosphoric acid (%) | | | Phosphoric acid (%) | | |
|---|---|---|---|---|---|---|
| | Ca | Mg | Al | Ca | Mg | Al |
| Embodiment 1 | 5.52 | 1.47 | 0.34 | 0.0034 | 0.0014 | 0.0007 |
| Embodiment 2 | 5.74 | 1.54 | 0.47 | 0.0028 | 0.0012 | 0.0005 |
| Embodiment 3 | 5.63 | 1.58 | 0.42 | 0.0031 | 0.0013 | 0.0007 |
| Embodiment 4 | 6.14 | 1.63 | 0.48 | 0.0038 | 0.0017 | 0.0004 |
| Embodiment 5 | 6.07 | 1.56 | 0.50 | 0.0040 | 0.0014 | 0.0004 |
| Comparative Example 1 | 6.16 | 1.57 | 0.46 | 0.0031 | 0.0018 | 0.0006 |
| Comparative Example 2 | 6.23 | 1.67 | 0.55 | 0.0172 | 0.0066 | 0.0084 |

TABLE 2

Electrochemical performance data of ferrous lithium phosphate material prepared in Embodiments 1-5 and Comparative Examples 1-2

| Samples | Discharge specific capacity ($mAh \cdot g^{-1}$)/Circle times | | | | Coulomb efficiency (%)/Circle times | | | | BET ($m^2/g$) |
|---|---|---|---|---|---|---|---|---|---|
| | 1 | 20 | 50 | 100 | 1 | 20 | 50 | 100 | |
| Embodiment 1 | 148.8 | 139.4 | 131.5 | 124.6 | 83.4 | 88.1 | 91.5 | 97.3 | 1.38 |
| Embodiment 2 | 146.9 | 137.9 | 132.2 | 125.7 | 82.3 | 87.9 | 91 | 95.9 | 1.2 |
| Embodiment 3 | 154.3 | 153.6 | 131.3 | 127.8 | 81.3 | 86.5 | 92.8 | 95.8 | 1.65 |
| Embodiment 4 | 151.2 | 146.1 | 132.8 | 128.3 | 80.4 | 88.3 | 92.3 | 96.9 | 1.31 |
| Embodiment 5 | 150.3 | 146.7 | 133.6 | 128.6 | 81.9 | 90.7 | 94.5 | 96.3 | 1.47 |
| Comparative Example 1 | 140.8 | 137.6 | 130.7 | 127.6 | 80.1 | 84.7 | 89.5 | 93.3 | 1.07 |
| Comparative Example 2 | 143.6 | 138.3 | 131.2 | 126.1 | 79.6 | 86.8 | 88.2 | 95.0 | 0.92 |

Figure 2:
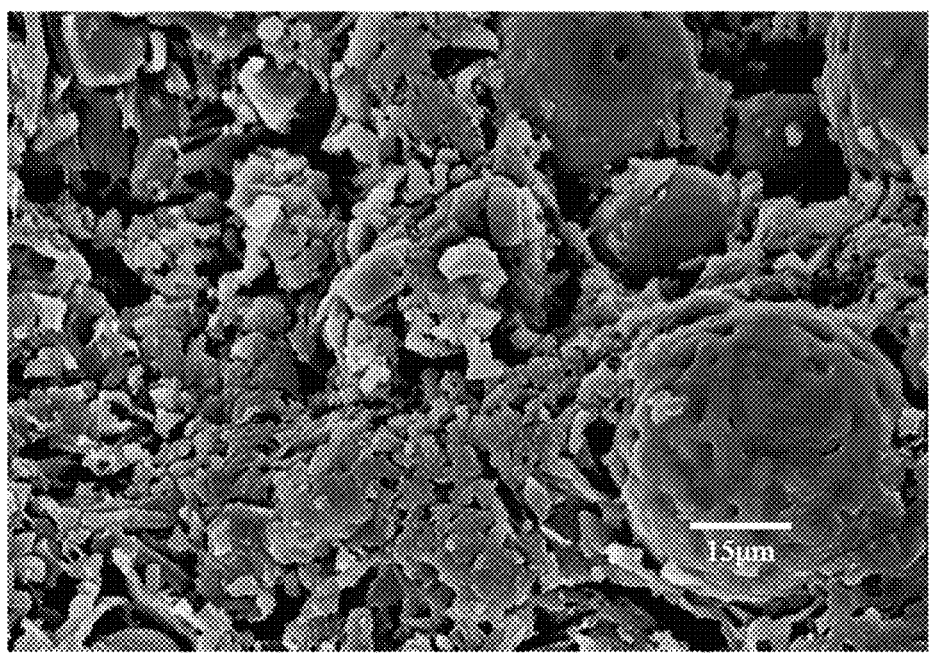
FIG. 2 is a SEM diagram of the ferrous lithium phosphate material of Embodiment 5.

Meanwhile, the ferrous lithium phosphate material of Embodiment 2 was tested by SEM, and the test results are shown in FIG. 1. The ferrous lithium phosphate material of Embodiment 5 was tested by SEM, and the test results are shown in FIG. 2.

It can be seen from Table 2 that the specific surface area of the ferrous lithium phosphate material prepared by the preparation method of the ferrous lithium phosphate material of the present application can reach 1.2 $m^2/g$ or more. At the same time, after the ferrous lithium phosphate material prepared by the preparation method of the ferrous lithium phosphate material of the present application is assembled into a battery, the first discharge specific capacity of the battery can reach 146.9 $mAh \cdot g^{-1}$ or more. After 100 cycles, its specific discharge capacity is still 124.6 $mAh \cdot g^{-1}$ or more, and its first coulomb efficiency is 80.4% or more. After 100 cycles, its coulomb efficiency can still reach 95.8% or more.

In addition, comparing Embodiment 1 and Comparative Examples 1-2, it can be seen that when the zinc source and copper source are not mixed through the specific complexing agent of the present disclosure in the preparation process of the ferrous lithium phosphate material, the specific surface area of the prepared ferrous lithium phosphate material will be significantly reduced, and the performance of the battery will also be significantly reduced after the ferrous lithium phosphate material is assembled into a battery.

Compared with Comparative Example 1 and Comparative Example 2, it can be seen that when the crude phosphoric acid solution is obtained by leaching with hydrochloric acid from the phosphorus concentrate, and when the specific extractant in the description of the present disclosure is used, the impurities such as calcium, magnesium and aluminum, etc., in the phosphoric acid prepared after evaporation and dehydration will be significantly reduced.

In addition, it can be seen from FIG. 1 and FIG. 2 that the ferrous lithium phosphate materials of Embodiments 2 and 5 exhibit a bark like loose and porous structure, and at the same time FIG. 2 shows the inclusion of parts of 20-50 μm spherical particles in the ferrous lithium phosphate material of Embodiment 5.

The above embodiments are preferred embodiments of the present disclosure, but the embodiments of the present disclosure are not limited by the foregoing embodiments, and any other alterations, modifications, substitutions, combinations, and simplification made without departing from the gist and principle of the present disclosure should be equivalent alternations, and all are included in the protection scope of the present disclosure.

The invention claimed is:

1. A preparation method of a ferrous lithium phosphate material, comprising the following steps:
   (1) mixing a zinc source, a copper source and a complexing agent solution, then mixing a resulting mixture with an iron source and a phosphate source, subjecting a resulting mixture to evaporating and dehydrating to obtain a jelly, and then performing primary sintering on the jelly under a protective atmosphere to obtain a solid-phase material;
   (2) mixing the solid-phase material prepared in step (1) with a lithium source, subjecting a resulting mixture to grinding and secondary sintering under a protective atmosphere to obtain the ferrous lithium phosphate material;
   wherein the complexing agent solution is obtained by mixing a citric acid solution and acetylacetone, a concentration of citric acid in the citric acid solution is 1 w/w % to 20 w/w %, and the acetylacetone accounts for 1 v/v % to 12 v/v % of the citric acid solution.

2. The preparation method of the ferrous lithium phosphate material of claim 1, wherein a mass of the zinc source accounts for 0.1 w/w % to 5 w/w % of the citric acid solution, and a mass of the copper source accounts for 0.1 w/w % to 5 w/w % of the citric acid solution.

3. The preparation method of the ferrous lithium phosphate material of claim 1, wherein a molar ratio of phosphate in the phosphate source, to iron in the iron source, and to lithium in the lithium source is (1.0-1.2):(1.0-1.05):(1.0-1.01).

4. The preparation method of the ferrous lithium phosphate material of claim 1, wherein a sintering temperature of the primary sintering and the secondary sintering is each 600 to 950° C., and the sintering time is each 6 to 15 hours.

5. The preparation method of the ferrous lithium phosphate material of claim 1, wherein a particle size of a resulting material after the grinding in step (2) is less than 80 μm.

6. The preparation method of the ferrous lithium phosphate material of claim 1, wherein the lithium source is at least one of lithium hydroxide, lithium carbonate, lithium nitrate or lithium chloride.

7. The preparation method of the ferrous lithium phosphate material of claim 1, wherein the phosphate source is at least one of phosphoric acid, ammonium phosphate, potassium phosphate, lithium phosphate, ammonium dihydrogen phosphate, sodium dihydrogen phosphate or potassium dihydrogen phosphate.

8. The preparation method of the ferrous lithium phosphate material of claim 7, wherein the phosphate source is phosphoric acid, which is prepared from a phosphorus concentrate.

* * * * *